(No Model.) 2 Sheets—Sheet 1.

H. A. TOBEY.
ART OF AND MECHANISM FOR RECORDING THE STATE OF METER REGISTERS.

No. 487,909. Patented Dec. 13, 1892.

Witnesses.
David C. Walter.
Isaac N. Huntsberger

Inventor.
Henry A. Tobey,
By Harmon Hall, His Atty.

THE NORRIS PETERS CO., PHOTO-LITHO., WASHINGTON, D. C.

(No Model.) 2 Sheets—Sheet 2.

H. A. TOBEY.
ART OF AND MECHANISM FOR RECORDING THE STATE OF METER REGISTERS.

No. 487,909. Patented Dec. 13, 1892.

Witnesses
David C. Walter.
Isaac N. Huntsberger

Inventor.
Henry A. Tobey,
By Hanson Hall,
His Attorney.

UNITED STATES PATENT OFFICE.

HENRY A. TOBEY, OF TOLEDO, OHIO.

ART OF AND MECHANISM FOR RECORDING THE STATE OF METER-REGISTERS.

SPECIFICATION forming part of Letters Patent No. 487,909, dated December 13, 1892.

Application filed October 8, 1891. Serial No. 408,098. (No model.)

*To all whom it may concern:*

Be it known that I, HENRY A. TOBEY, a citizen of the United States, residing at Toledo, Lucas county, Ohio, have invented certain new and useful Improvements in the Art and Mechanism for Recording the State of Meter-Registers and other Indicating Apparatus, of which the following is a specification.

The usual manner of "reading" meters, or, rather, the indicating hands and dials of the registers of meters and other machines in which the number of movements of parts is mechanically indicated, has been to personally inspect the register and to extend in writing on the spot the result or sum of the several numbers indicated by the hands or pointers upon the dials of the register. Gas and water meters are usually in dark places and places difficult of access, and for these reasons the reading of the meter is frequently inaccurate and attended with much inconvenience and loss of time.

My invention relates to and its object is to provide means for obviating the difficulties here pointed out, and to furnish a method and device for mechanically and instantly taking an exact copy of the dial-face and pointers of the meter-register, thus furnishing an accurate record for preservation and permitting computations at the convenience of the inspector. I attain these objects by means of the mechanism and arrangement of parts hereinafter described, and illustrated in the accompanying drawings, made part hereof, in which—

Figure 1:
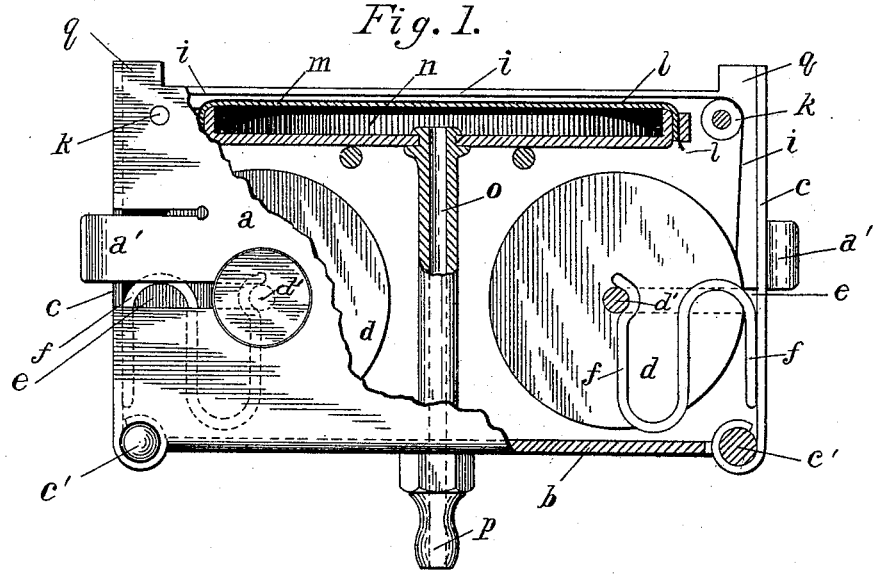
Figure 2:
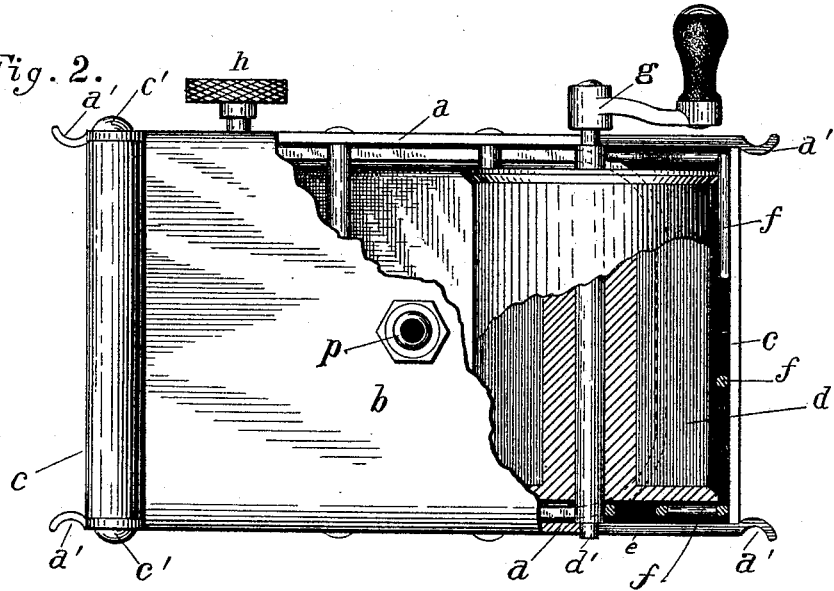
Figure 3:
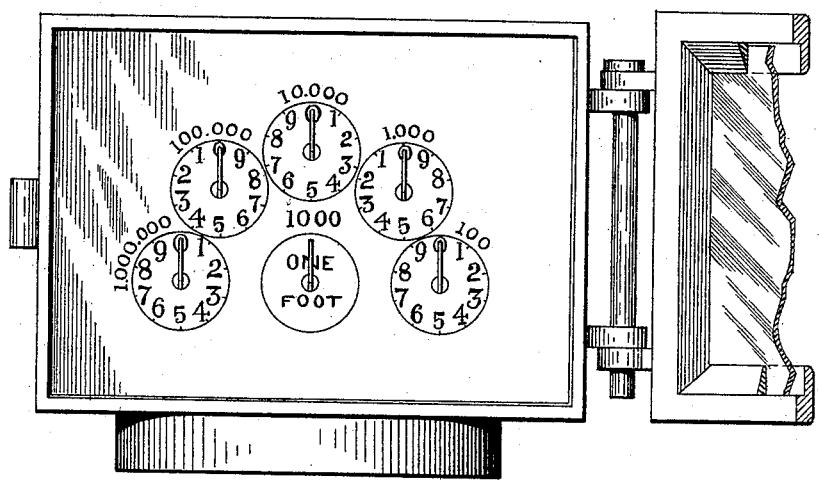

Figure 1 is a side elevation of my device with a portion of the case removed; Fig. 2, a plan view of the back of my device with part of the case removed; Fig. 3, the dial-face of a meter-register, adapted to my method; and Fig. 4, a plan view of the face of my device, showing paper prepared to correspond with dial-face, Fig. 3, and in position to receive imprint from the hands or pointers of meter-register.

The same letters indicate the same or like parts throughout the several views.

In the drawings, $a$ is the side, $b$ the back, and $c$ the ends, of the rectangular case or frame of my device, the remaining side or face of the case being open. The open face or side of the case is adapted to fit and coincide with the faces of the meter-registers to which my device is to be applied and is supplied with suitable guides $q$, by means of which it may be readily applied to the face of a meter-register in the dark, if desired. The ends $c$ of the case at their edges adjoining the back of the case are hinged and form lids, which may be opened and closed at will, the curved extensions $a'$ of sides $a$ forming spring-snap fastenings for these lids. Inside the case are two spools $d\ d$, the spindles of which rest and revolve in slots $e$ in the sides of the case. When the lids $c$ are open, spools $d$ may be readily introduced into or removed from the case, the spindles $d'$ being received by slots $e$. When the lids $c$ are closed, both spindles are pressed and held in place against the inner ends of slots $e$ by springs $f$, attached to the lids $c$. These springs, by their friction on the spindles, prevent the spools from turning, except when revolved by a crank $g$ or a milled head $h$, with which the spindles are provided. Upon one spool is wound a long strip or ribbon $i$ of thin strong paper, upon the inner side of which is printed at regular intervals fac-similies of the dial-face of the meters to be recorded, as indicated by dotted lines in Fig. 4. The free end of ribbon $i$ is brought over rollers or rods $k\ k$ and attached to the spool having crank $g$, as shown in Figs. 1 and 3, so that by revolving the crank the paper is unwound from one spool and transferred to the other. Immediately back of the paper ribbon is an inked pad or ribbon arranged to be pressed against the paper. In the example shown I have passed an inked ribbon $l$ over an india-rubber diaphragm $m$, which covers a chamber $n$, from which leads a tube $o$, terminating in nipple $p$, to which may be attached an india-rubber tube provided with a hand-bulb. (Not shown in the drawings.) When the hand-bulb is pressed, compressed air in tube $o$ and chamber $n$ forces diaphragm $m$ and inked ribbon $l$ outward.

Figure 4:
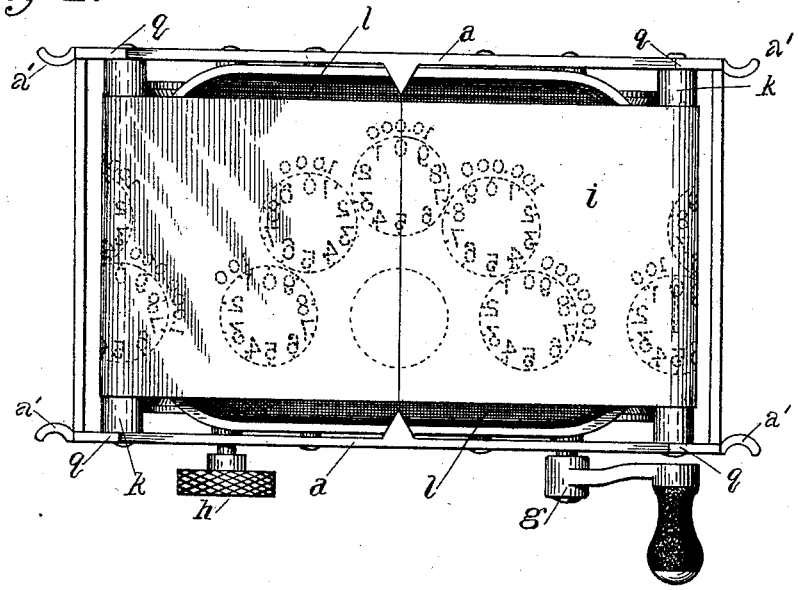

The operation of my device is obvious. The operator opens the glass door of the dial-face of the meter, exposing the dials. The dials are painted or printed in the usual way. The number of the meter—"1,000"—is in raised characters, and the flat hands or pointers lie close to the face of the dial-plate. The paper, which has been previously wound forward, as shown in Fig. 4, is pressed against the dial-face, so that the dials printed on the inner side of the paper coincides with the dials on the meter. The hand-bulb is now pressed and the inked ribbon or pad $l$ is forced against the paper, squeezing the paper between the inked pad and the projecting hands or pointers and the raised characters on the dial-plate, making an inked impression of the hands or pointers and raised characters upon the paper, the previously-printed dial and the new impression together making an exact copy of the dial-face, its hands or pointers, and the number of the meter. The record thus taken is wound upon its spool, and the machine is now ready for a repetition of the operation.

All of the characters on the face of the dial-plate may be raised, if desired, and the prepared fac-similes of the dial-faces on the ribbon may be dispensed with; but I prefer the method indicated above.

I do not limit my invention to the exact form of hand-stamp here pointed out, as many substitutes for the stamp shown will suggest themselves to those skilled in the art.

I am aware that it is not new to employ a dial-face with raised characters and to ink the dial-face and hands and to print directly therefrom. In practice it is found that successive daubing of the dial-face and hands with ink clogs the hands, interferes with the easy working of the meter, renders the reading of the meter in the usual way difficult, and in time gives impressions which are blurred and undecipherable. These objections are overcome by my invention, which does not permit the ink to touch the dial-face or hands.

What I claim as new, and desire to secure by Letters Patent, is—

1. The art or method of recording the state of meter-registers, which consists in printing upon the paper to be used copies of the dial-faces to be read, then taking an impression of the dial-hands and number of meter by pressing said prepared paper between the dial-plate of the meter and a suitable inking pad or ribbon, substantially as shown and described, for the purpose specified.

2. A machine for recording the state of meter-registers, comprising in its construction a case or frame adapted to fit the face of a meter-register and containing two spools with means for revolving the same, a ribbon or paper on said spools, having thereon copies of the faces of the dial-plates of the meters to be recorded, an inking pad or ribbon adjacent to the inner side of said ribbon or paper, and means for pressing said pad against said ribbon or paper, all substantially as shown and described, for the purpose specified.

3. In a machine for recording the state of meter-registers, a strip or ribbon of paper having thereon copies of the faces of the dial-plates of the meters to be recorded, substantially as shown and described, for the purpose specified.

4. In a machine for recording the state of meter-registers, a case having slotted sides, spools with their spindles mounted in said slots, and hinged lids provided with springs adapted to press said spindles into place, in combination with a strip of paper on said spools, an inking pad or ribbon back of said strip of paper, and means for actuating said inking pad or ribbon, substantially as shown and described, for the purpose specified.

HENRY A. TOBEY.

Witnesses:
DAVID C. WALTER,
L. E. BROWN.